(12) United States Patent
Kimmel et al.

(10) Patent No.: US 8,314,819 B2
(45) Date of Patent: Nov. 20, 2012

(54) DISPLAYS WITH INTEGRATED BACKLIGHTING

(75) Inventors: Jyrki Kimmel, Tampere (FI); Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 199 days.

(21) Appl. No.: 12/664,154

(22) PCT Filed: Jun. 14, 2007

(86) PCT No.: PCT/IB2007/001604
§ 371 (c)(1),
(2), (4) Date: Apr. 19, 2010

(87) PCT Pub. No.: WO2008/152436
PCT Pub. Date: Dec. 18, 2008

(65) Prior Publication Data
US 2010/0207964 A1   Aug. 19, 2010

(51) Int. Cl.
*G09G 5/10* (2006.01)
*G09G 3/36* (2006.01)
(52) U.S. Cl. ............... 345/690; 345/102; 349/62
(58) Field of Classification Search .......... 345/690, 345/87–104, 204; 349/61–71
See application file for complete search history.

(56) References Cited

U.S. PATENT DOCUMENTS

| | | | |
|---|---|---|---|
| 3,963,310 A * | 6/1976 | Giallorenzi et al. | 349/196 |
| 5,868,480 A | 2/1999 | Zeinali | 353/31 |
| 5,991,083 A | 11/1999 | Shirochi | 359/618 |
| 6,830,339 B2 * | 12/2004 | Maximus | 353/20 |
| 6,878,494 B2 * | 4/2005 | Sutehrland et al. | 430/2 |
| 2001/0005246 A1 * | 6/2001 | Takiguchi et al. | 349/117 |
| 2003/0218701 A1 | 11/2003 | Kawakami | 349/65 |
| 2007/0040950 A1 | 2/2007 | Jung | 349/5 |
| 2007/0187242 A1 * | 8/2007 | Nair et al. | 204/450 |

FOREIGN PATENT DOCUMENTS

| | | |
|---|---|---|
| EP | 0 733 928 A2 | 9/1996 |
| EP | 1 072 934 A2 | 1/2001 |
| EP | 1 439 409 A1 | 7/2004 |
| GB | 2 260 203 A | 4/1993 |
| JP | 2001166296 A | 6/2001 |
| WO | WO-01/86200 A1 | 11/2001 |
| WO | WO 2008/059319 A1 | 5/2008 |

OTHER PUBLICATIONS

Levola, T. et al., "Replicated slanted gratings with a high refractive index material for in and outcoupling of light", Mar. 5, 2007, Optics Express 2067, vol. 15, No. 5.
Touchscreen article from www.wikipedia.org/wiki/Touchscreen, 5 pgs. May 23, 2007.
Crowder, R.M., article "Automation and Robotics, Tactile sensing", www.soton.ac.uk, 10 pgs. May 23, 2007.
"Replicated slanted gratings with a High refractive index material for in and outcoupling of light", Tapani Levola et al., Optics Express, vol. 15, No. 5, Mar. 2007, pp. 2067-2074.

* cited by examiner

*Primary Examiner* — Stephen Sherman
(74) *Attorney, Agent, or Firm* — Harrington & Smith

(57) ABSTRACT

The specification and drawings present a new apparatus and method for designing and using display devices with integrated backlight layer structure utilizing separate color diffractive out-coupling (e.g., diffraction out-coupling). A lower substrate of the display can be used to integrate the backlight component (or the backlight layer structure), thus enabling a thin module with the integrated backlighting.

22 Claims, 7 Drawing Sheets

DISPLAYS WITH INTEGRATED BACKLIGHTING

TECHNICAL FIELD

The present invention relates generally to electronic devices comprising displays and, more specifically, to display device structures with integrated backlighting utilizing separate color coupling.

BACKGROUND ART

In a present state of technology a liquid crystal display (LCD) is essentially a stack of optical films and glass, having been developed as a series of improvements over a legacy platform of the flat panel display. The basic structure of an active-matrix LCD incorporates a thin-film transistor backplane that defines the pixel structure of the display. A backlight is used to launch light through the pixel structure. Currently, white light is essentially uniformly spread on the pixel array, where part of it is blocked by the transistor structure, and the rest is filtered through the pixel (or subpixel) color filters typically to red, green, and blue light. Then the liquid crystal (LC) is used to modulate the intensity of the light passing through the pixel. It is evident that a lot of light is wasted in the absorption of unwanted light, and the resulting structure is unnecessarily thick due to stacking of films. In the present state of technology the backlight structure is usually implemented as a separate panel/structure from the display panel substrate comprising the thin-film transistor backplane.

DISCLOSURE OF THE INVENTION

According to a first aspect of the invention, an apparatus, comprises: a first substrate; a second substrate; and a modulation layer between the first and second substrates, wherein light modulation in predetermined areas of the modulation layer corresponding to pixels comprising conductive electrodes and located on the first or the second substrate is provided by applying electric signals corresponding to data of an image to the pixels for providing electric fields between the pixels and an electrically conducting layer of an opposite substrate, the first or the second substrate, wherein the first substrate comprises at least one optical layer configured to provide launching of a plurality of lights of different colors and further comprises one or more optical layers configured to provide diffractive out-coupling of portions of each of the plurality of lights of different colors to pre-selected pixels or subpixels of the pixels separately from other colors of the different colors, wherein the second substrate is configured to provide further out-coupling of the portions of each of the plurality of lights of different colors after being light modulated by the electric fields corresponding to the data of the image for providing the image.

According further to the first aspect of the invention, the first substrate may comprise the electrically conducting layer and the second substrate may comprise the pixels.

Further according to the first aspect of the invention, the first substrate may be a planar rigid substrate.

Still further according to the first aspect of the invention, the one or more optical layers may comprise one optical layer with disposed a further plurality of diffraction gratings such that each of the diffraction gratings may be configured to provide the diffractive out-coupling for only one color of the different colors, the further plurality being equal to the plurality. Still further, the one or more optical layers may further comprise a cladding layer next to the one optical layer for providing the diffractive out-coupling, wherein index of refraction of the cladding layer is substantially lower than index of refraction of the one optical layer. Yet still further, at least one of the further plurality of diffraction gratings may be a slanted grating.

According further to the first aspect of the invention, the plurality of lights may be red, green and blue.

According still further to the first aspect of the invention, the at least one optical layer may be configured to provide the launching the plurality of lights using at least one of prism coupling, edge coupling, grating coupling and butt coupling.

According yet still further to the first aspect of the invention, portions of each of the plurality of lights of different colors may have a predetermined optical polarization.

According further still to the first aspect of the invention, the modulation layer may be a liquid crystal and the light modulation may be provided for varying a state of optical polarization of the portions of each of the plurality of lights of different colors. Still further, the apparatus may further comprise a polarization layer configured to provide, after the varying the state of optical polarization, the light intensity modulation of the portions of each of the plurality of lights of different colors for the further out-coupling from the second substrate, wherein the polarization layer is disposed on the second substrate or the polarization layer is a separate layer next to the second substrate.

Yet still further according to the first aspect of the invention, the at least one optical layer may be made of a birefringent material or the first substrate may further comprise a birefringent layer next to the at least one optical layer for redistributing optical polarization states of the plurality of lights of different colors to increase efficiency of the out-coupling.

Still yet further according to the first aspect of the invention, the first substrate or the first and second substrates may be made of substantially non-absorbing optical materials.

Still further still according to the first aspect of the invention, the modulation layer may be an electro-wetting material.

According further to the first aspect of the invention, each of the pixels may comprise a conductive electrode and a thin-film transistor structure for applying the electric signals.

Further according to the first aspect of the invention, the electrically conducting layer and the conductive electrodes may be made of indium tin oxide.

Still further according to the first aspect of the invention, the electrically conducting layer may be a wiregrid polarizer.

According further to the first aspect of the invention, the apparatus may further comprise a corresponding color filter next to each of the pixels to further provide intended spectral content of the portions of each of the plurality of lights of different colors.

According to a second aspect of the invention, a method, comprises: launching a plurality of lights of different colors to at least one optical layer of a first substrate; diffractively out-coupling portions of each of the plurality of lights of different colors to pre-selected pixels or subpixels of pixels comprising conductive electrodes and located on the first or a second substrate using one or more optical layers of the first substrate; light modulating portions of each of the plurality of lights of different colors in predetermined areas of a modulation layer corresponding to the pixels by applying electric signals corresponding to data of an image to the pixels for providing electric fields between the pixels and an electrically conducting layer of an opposite substrate, the first or the second substrate, wherein the modulation layer is between the first and second substrates; and further out-coupling the portions of each of the plurality of lights of different colors out Of the second substrate after being light modulated by the electric fields corresponding to the data of the image for providing the image.

According further to the second aspect of the invention, the first substrate, the second substrate and the modulation layer may be parts of a display device. Still further, the display device may be a liquid crystal display, an electro-wetting display, a microelectromechanical system display or an electrophoretic display.

Further according to the second aspect of the invention, the launching of the plurality of lights of different colors may be provided by light emitting diodes.

Still further according to the second aspect of the invention, the first substrate may comprise the electrically conducting layer and the second substrate may comprise the pixels.

Yet still further according to the second aspect of the invention, the one or more optical layers may comprise one optical layer with disposed a further plurality of diffraction gratings such that each of the diffraction gratings is configured to provide the out-coupling for only one color of the different colors, the further plurality being equal to the plurality. Still further, the one or more optical layers may further comprise a cladding layer next to the one optical layer for providing the diffractive out-coupling, wherein index of refraction of the cladding layer is substantially lower than index of refraction of the one optical layer. Yet still further, at least one of the further plurality of diffraction gratings may be a slanted grating.

According still further to the second aspect of the invention, the at least one optical layer may be made of a birefringent material or the first substrate further may comprise a birefringent layer next to the at least one optical layer for redistributing optical polarization states of the plurality of lights of different colors to increase efficiency of the out-coupling.

According to a third aspect of the invention, an electronic device, comprises:
  a data processing unit;
  an optical engine operatively connected to the data processing unit for receiving data of an image from the data processing unit;
  a display device with integrated backlighting operatively connected to the optical engine for forming the image based on the data, comprising: a first substrate; a second substrate; and a modulation layer between the first and second substrates, wherein light modulation in predetermined areas of the modulation layer corresponding to pixels comprising conductive electrodes and located on the first or the second substrate is provided by applying electric signals corresponding to data of an image to the pixels for providing electric fields between the pixels and an electrically conducting layer of an opposite substrate, the first or the second substrate, wherein the first substrate comprises at least one optical layer configured to provide launching of a plurality of lights of different colors and further comprises one or more optical layers configured to provide diffractive out-coupling of portions of each of the plurality of lights of different colors to pre-selected pixels or subpixels of the pixels separately from other colors of the different colors, wherein the second substrate is configured to provide further out-coupling of the portions of each of the plurality of lights of different colors after being light modulated by the electric fields corresponding to the data of the image for providing the image.

According further to the third aspect of the invention, the one or more optical layers may comprise one optical layer with disposed a further plurality of diffraction gratings such that each of the diffraction gratings may be configured to provide the out-coupling for only one color of the different colors, the further plurality being equal to the plurality.

According to a fourth aspect of the invention, an apparatus, comprises: first means for light propagation; second means for light propagation; and means for modulation between the first and second means for light propagation, wherein light modulation in predetermined areas of the means for modulation corresponding to pixels comprising conductive electrodes and located on the first or the second means for light propagation is provided by applying electric signals corresponding to data of an image to the pixels for providing electric fields between the pixels and an electrically conducting layer of an opposite means for light propagation, the first or the second means for light propagation, wherein the first means for light propagation comprises at least one optical layer configured to provide launching of a plurality of lights of different colors and further comprises one or more optical layers configured to provide diffractive out-coupling of portions of each of the plurality of lights of different colors to pre-selected pixels or subpixels of the pixels separately from other colors of the different colors, wherein the second means for light propagation is configured to provide further out-coupling of the portions of each of the plurality of lights of different colors after being light modulated by the electric fields corresponding to the data of the image for providing the image.

According further to the fourth aspect of the invention, the first means for light propagation may be a first substrate, the second means for light propagation may be a second substrate and the means for modulation may be a modulation layer.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1:
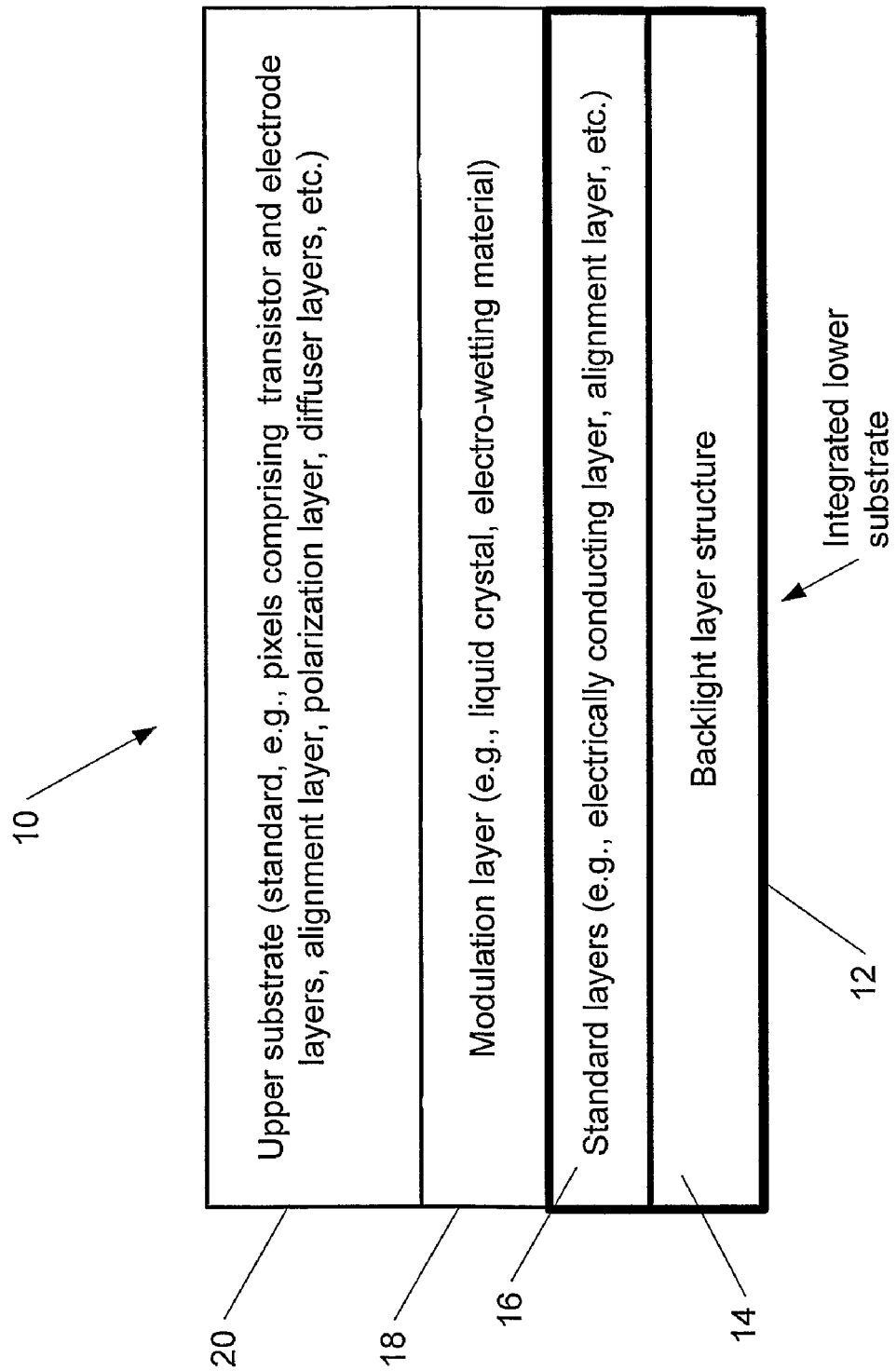
FIG. 1 is a schematic representation of a display structure with integrated backlighting, according to an embodiment of the present invention.

A new apparatus and method are provided for designing and using display devices with integrated backlight layer structures utilizing separate color diffractive out-coupling (e.g., diffraction out-coupling). According to embodiments of the present invention, a lower substrate of the display can be used to integrate the backlight component (or the backlight layer structure), thus enabling a thin module with the integrated backlighting. The display devices can be (but are not limited to): liquid crystal displays (LCDs), electro-wetting displays, microelectromechanical system (MEMS) displays, electrophoretic displays, etc. The diffractive optics principles of the PCT application 061327WO filed on Nov. 17, 2006 for a separate panel/structure can be used for the separate color diffractive out-coupling using the integrated solution described herein.

According to an embodiment of the present invention, the apparatus (e.g., the display device) can comprise: a first (e.g., a lower substrate) substrate, a second substrate (e.g., an upper substrate); and a modulation layer between the first and second substrates, wherein light modulation in predetermined areas of the modulation layer corresponding to pixels of conducting material (i.e., conductive electrodes) located on the first or the second substrate is provided by applying electric signals corresponding to data of an image to said pixels for providing electric fields between the pixels and an electrically conducting layer (e.g., optically transparent indium tin oxide, ITO) of an opposite substrate, the first or the second substrate, and wherein the first substrate comprises at least one optical layer configured to provide launching of a plurality of lights of different colors and further comprises one or more optical layers configured to provide out-coupling (e.g., using diffraction gratings) of portions of each of the plurality of lights of different colors to pre-selected pixels or subpixels of said pixels (i.e., all display pixels) separately from other colors of the different colors, wherein said second substrate is configured to further out-couple the portions of each of the plurality of lights of different colors after being light modulated by said electric fields corresponding to said data of the image for providing said image. If the modulation layer is a liquid crystal (used in LCDs), then the light modulation is provided for varying a state of optical polarization of the portions of each of said plurality of lights of different colors (typically each of said plurality of lights of different colors has a predetermined optical polarization), and a polarization layer (e.g., disposed on the second substrate or a separate layer next to the second substrate) is configured to provide, after said varying the state of optical polarization, the light intensity modulation of said portions of each of the plurality of lights of different colors for out-coupling from the second substrate.

It is noted that the pixel defines the resolution of the display and is the smallest element (area) comprising averaged brightness and color information of that element. In the context of this invention the subpixel is a part of the pixel, and comprises one color defining the brightness of that color.

Moreover, the one or more optical layers, described herein, can comprise one optical layer with a number (e.g., equal to the plurality of lights) of diffraction gratings or grating arrays disposed on it such that each of the diffraction gratings is configured to provide the out-coupling for only one color of the different colors. Furthermore, the one or more optical layers can further comprise a cladding layer next to said one optical layer for providing the diffractive out-coupling, wherein the index of refraction of the cladding layer is substantially lower than the index of refraction of said one optical layer. Also, using diffractive slanted gratings (e.g., see T. Levola, P. Laakkonen "Replicated Slanted Gratings with a High Refractive Index Material for in and Outcoupling of Light", Optics Express, vol. 15, No. 5, pages 2067-2074) can provide an improvement in the out-coupling efficiency of the diffraction gratings. It is further noted that a corresponding color filter next to each of the pixels can be used to further provide intended spectral content of said portions of each of the plurality of lights of different colors.

In one further embodiment, the display structure can be an inverted thin-film transistor based display structure such as LCD, where the transistor layer (e.g., implemented as thin-film transistor (TFT) layer), identifying pixels, is on the upper substrate of the display, whereas the lower substrate of the display is used to integrate the backlight component and the electrically conducting layer (for applying the electric signals corresponding to the data of an image), as described herein, thus using this backlight component as close as possible to the LC (liquid crystal) layer in order to have maximum control of the diffracted (out-coupled) light. However, in general, the pixels can be located on the lower substrate integrated with the backlight component and the electrically conducting layer can be located on the opposite (upper) substrate. Each pixel can comprise a conductive electrode (e.g., made of ITO) and a thin-film transistor (TFT) structure for applying the electric signals corresponding to the data.

According to various embodiments, a variety of different types of substrate (e.g., glass, polymer, planar, rigid, flexible, etc.) and displays with multiple primary colors (e.g., two, three or more) can be used. Also the light can be launched into the lower substrate of the display by using prism, edge, grating, butt coupling, etc. The launching of the plurality of lights of different colors can be provided by light emitting diodes (LEDs), lasers, CCFL (cold cathode fluorescent light) micro lamps, CNT (cathodoluminescent) light sources, etc.

The substrate can include a launch/fan-out structure that can distribute the launched light along the edge area of the display. For example, one color can be coupled in from its respective corner or corners, and other primary colors respectively from their own corners. All primaries can have their own launch/fanout areas that are designed to provide a uniform distribution of light into the substrate. Light then can travel in the substrate relatively freely, e.g., due to total internal reflection by controlling launch angles at the launch/fanout area. If the inverted structure is used, the transistor TFT structure would not interfere with the propagation of light in the lower substrate at all.

The embodiments of the present invention describing the integrated structure can provide significant savings in light throughput efficiency which will result in brighter displays, can create savings in power consumption of the display, may result in a better color gamut, and can enable a much thinner component to be manufactured.

FIG. 1 shows an example among others of a schematic representation of a display structure 10 with integrated backlighting, according to an embodiment of the present invention. The structure 10 comprises a lower substrate 12, a modulation layer 18 and an upper substrate 20. The lower substrate 12 comprises a backlight layer structure 14, as described herein, integrated with standard layers, e.g., electrically conducting layer, alignment layer for a liquid crystal in the LCDs, etc., according to various embodiments of the present invention. The modulation layer 18 could be a liquid crystal, electro-wetting material, a MEMS structure, etc. The upper substrate 20 typically comprises standard layers, e.g., pixels comprising transistor (TFT) and electrode (e.g., ITO) layers, an alignment layer for a liquid crystal in the LCDs, polarization and diffuser layers (e.g., for LCDs). It is noted that polarization and diffuser layers could be disposed on the upper substrate or could be separate layers (foils) next to the upper substrate. It is noted that the substrates 12 and 20 are typically made of substantially non-absorbing optical materials.

It is noted that the lower substrate 12 can generally be means for light propagation or a structural equivalence (or an equivalent structure) thereof. Similarly, the upper substrate 20 can generally be means for light propagation or a structural equivalence (or equivalent structure) thereof. Also, the modulation layer 18 can generally be means for modulation or a structural equivalence (or equivalent structure) thereof.

Figure 2:
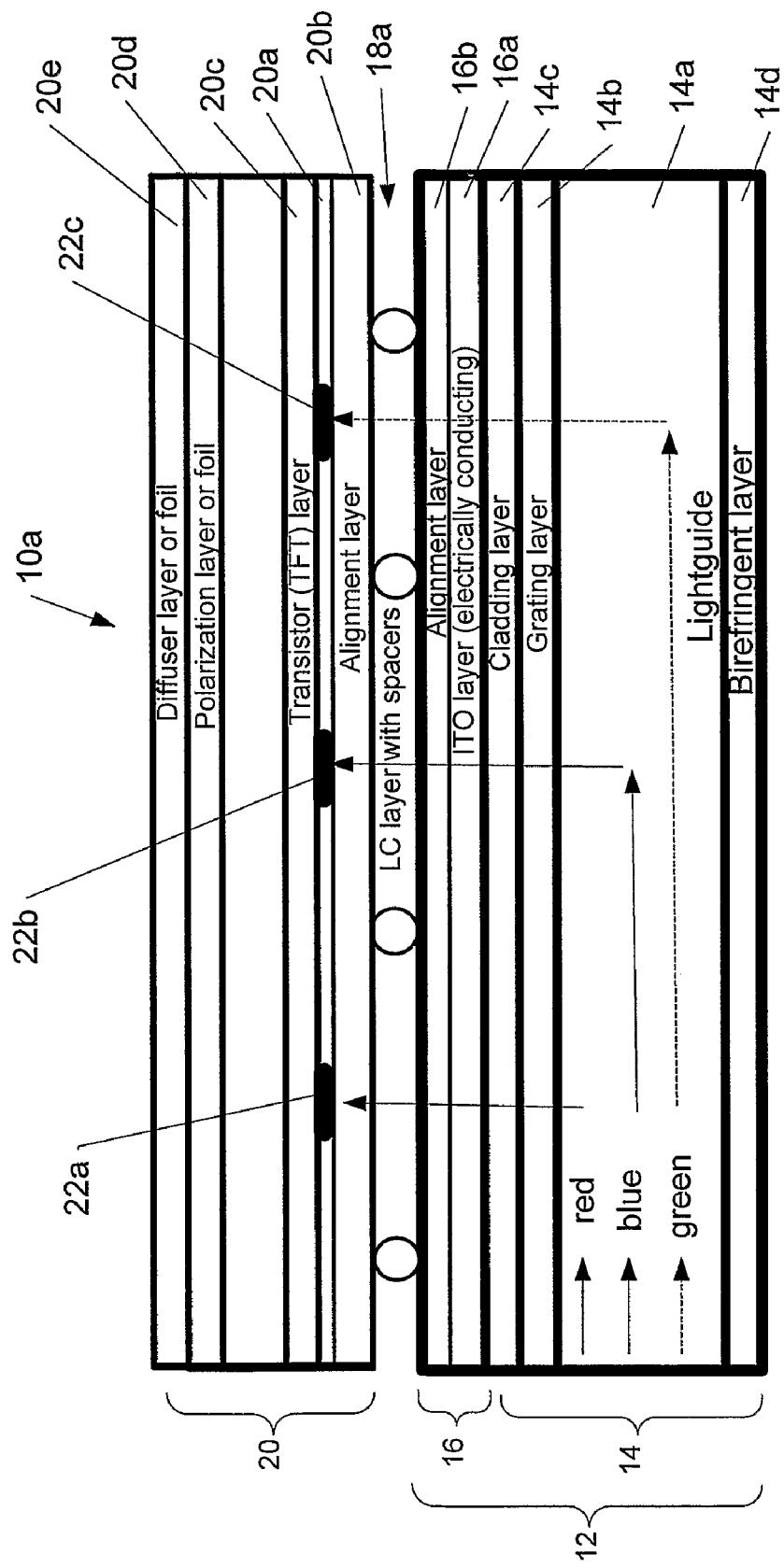
FIG. 2 is a schematic representation for a specific implementation of a liquid crystal display structure with integrated backlighting, according to an exemplary embodiment of the present invention.

FIG. 2 shows another example among others of a schematic representation for a specific implementation of a liquid crystal display (LCD) structure 10a with integrated backlighting, according to an exemplary embodiment of the present invention.

The backlight layer structure 14 comprises a lightguide 14a for launching lights of different colors (e.g., red, blue and green) which are separately out-coupled by the grating layer 14b, as shown in FIG. 2, to corresponding pixels 22a, 22b and 22c (or pixel array) on the upper substrate 20. Furthermore, the backlight layer structure 14 can comprise a cladding layer 14c next to the grating layer 14b for providing effective diffractive out-coupling by the grating layer 14b, wherein the index of refraction of the cladding layer 14c is substantially lower than the index of refraction of the grating layer 14b. Moreover, the backlight layer structure 14 can further comprise a birefringent layer 14d next to the lightguide 14a for redistributing optical polarization states of the plurality of lights (e.g., red, blue and green) launched to the lightguide 14a for increasing efficiency of the diffractive out-coupling. The birefringent layer 14d may not be needed if at least the lightguide 14a and possibly other layers of the backlight layer structure 14 are made of a birefringent material.

The standard layers 16 of the lower substrate 12 can comprise an electrically conducting layer (e.g., made of ITO) 16a for providing an electrical contact to perform light modulation, and an alignment layer 16b to support operation of a liquid crystal (LC) layer 18a (with spacers as standard technology). It is further noted that a polarizer layer can be functionally a part of the layer 16a, e.g., a wiregrid polarizer can be simultaneously an electrode (for providing said electrical contact to perform light modulation) and a polarizer. This wiregrid polarizer can also perform a function of an alignment layer 16b. The upper substrate 20 can comprise another alignment layer 20a to support operation of a liquid crystal layer 18a, and an array of pixels 22a, 22b and 22c. Each pixel can comprise a conductive electrode layer 20b (e.g., made of ITO) and a thin-film transistor (TFT) layer 20c for applying the electric signals corresponding to the image data. It is noted that the pixels can also have an additional color filter (not shown in FIG. 2) to provide the desired spectral purity of the lights of different colors diffractively out-coupled by the grating layer 14b. Finally, polarization and diffuser layers 20d and 20e could be disposed on the upper substrate 20 or provided as separate layers (foils) next to the upper substrate 20.

It is noted that the example of FIG. 2 demonstrates launching lights of different colors (e.g., red, blue and green) to corresponding pixels 22a, 22b and 22c according to one embodiment of the present invention, but the same principle can be applied to launching of lights of different colors to subpixels defined herein.

As it is stated herein, the diffractive optics principles of the PCT application 061327WO filed on Nov. 17, 2006 for a separate panel/structure can be applied for the separate color diffractive out-coupling using the integrated solution described herein and are incorporated here by reference. For completeness, some embodiments of the PCT application 061327WO are provided below in regard to FIGS. 3-5.

Figure 3:
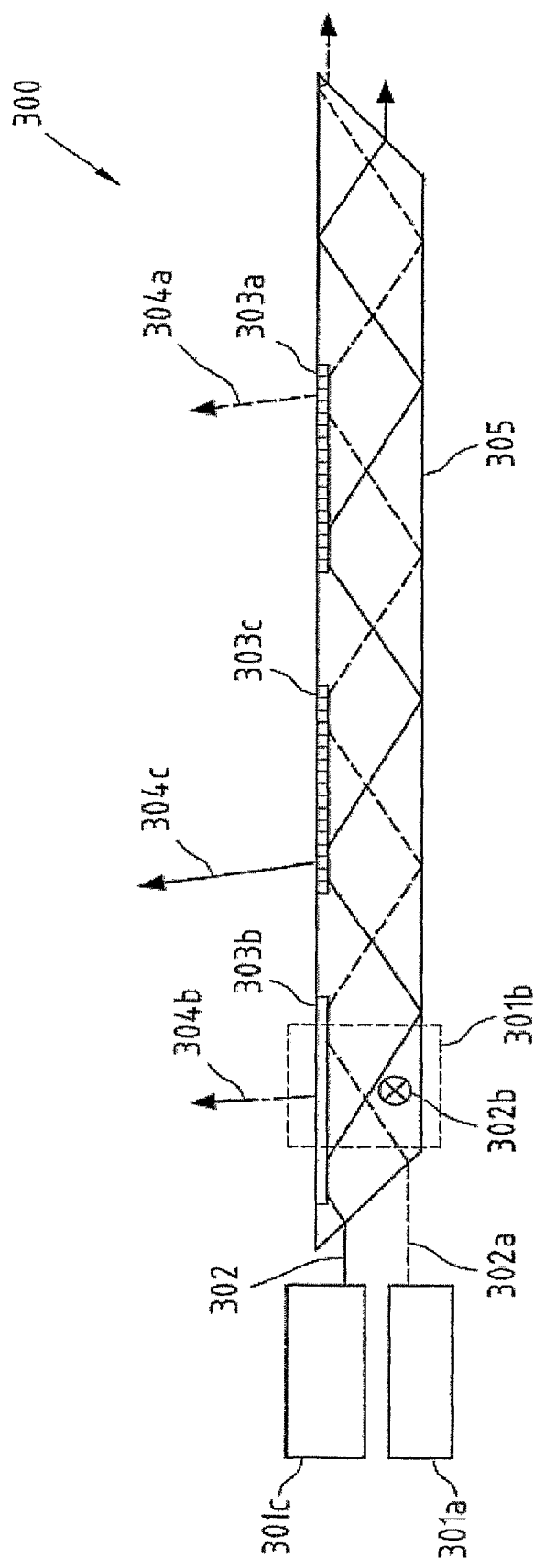
FIG. 3 is a cross-sectional view of an out-coupling layer which can be used in a backlight layer structure of FIGS. 1 and 2.

FIG. 3 is a cross-sectional view of an out-coupling layer (or apparatus) 300 which can be used in a backlight layer structure of FIGS. 1 and 2 to separately couple out the red, green and blue lights from the medium at predetermined positions. The apparatus 300 is equivalent to layers 14b and 14c of FIG. 2.

The apparatus 300 comprises a waveguide 305 with out-coupling diffraction gratings 303a, 303b and 303c for red (wavelength 630 nm), green (wavelength 530 nm) and blue light (wavelength 460 nm), respectively. The diffraction gratings may for instance be embossed on the surface of a waveguide 305 or otherwise formed in or attached to the surface of waveguide 305. Therein, directly forming the diffraction gratings on the surface of waveguide 305 yields a particularly cost-efficient structure. Via an interface, e.g., the air-waveguide interface (in FIG. 2, this interface is determined by the cladding layer 14c), the waveguide 305 receives red light 302a from a light source 301a, green light 302b from a light source 301b and blue light 302c from a light source 301c. Therein, the light sources 301a, 301b and 301c may for instance be Light Emitting Diodes (LEDs) or lasers, such as for instance semiconductor, frequency-doubled or pumped solid-state lasers. In this configuration, the red light 302a and the blue light 302c are received in the waveguide 305 in orthogonal direction with respect to the green light 302b, i.e., the red light 302a and the blue light 302c are received in a direction that is parallel to the plane in which the cross-sectional view of FIG. 3 is lying, and the green light 302b is received in a direction that is parallel to the normal vector of the plane and that is illustrated as an "X" within a circle.

Therein, each light field is assumed to propagate inside the waveguide 305 at a range of angles that supports total internal reflection, i.e., the red light 302a, the green light 302b and the blue light 302c are reflected from top and bottom surfaces of the waveguide 305 thus supporting guided mode propagation.

Figure 5:
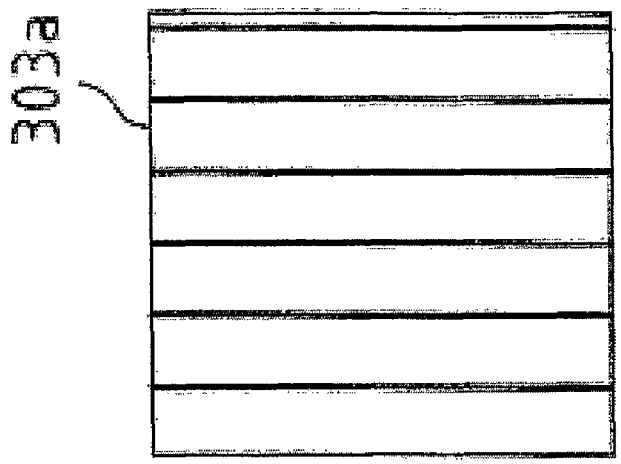
FIG. 5 is a schematic representation illustrating the orientation of the out-coupling diffraction gratings of the out-coupling module shown in FIGS. 3 and 4.
Figure 5:
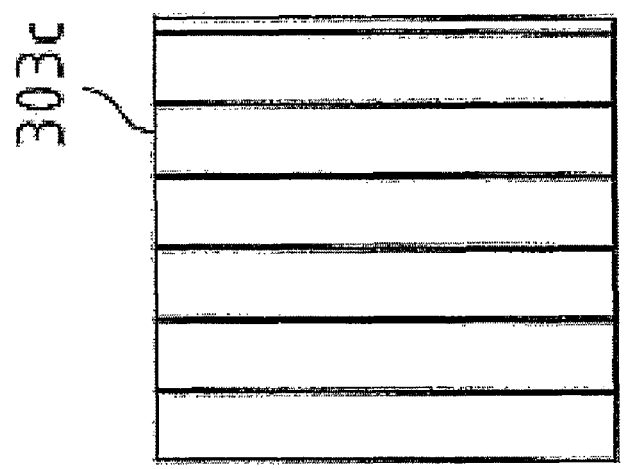
Figure 5:
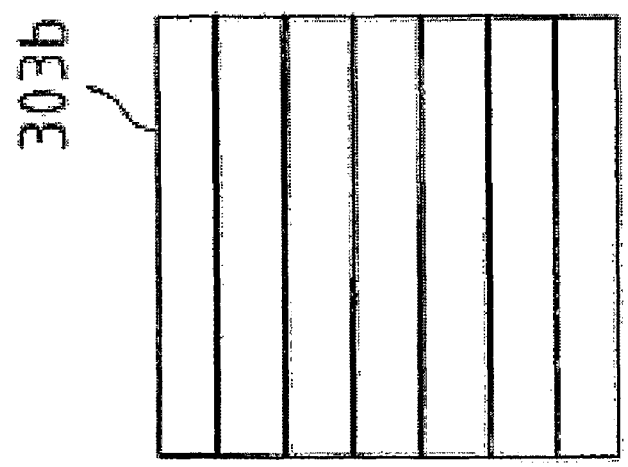

Via the out-coupling diffraction gratings 303a for red light, 303b for green light and 303c for blue light, red light 304a, green light 304b and blue light 304c are coupled out of waveguide 305. The orientation of the out-coupling gratings 303a, 303b and 303c is depicted in FIG. 5. It is readily visible that the diffraction grating 303a for red light and the diffraction grating for blue light 303c have the same orientation, whereas the diffraction grating 303b for green light has an orthogonal orientation.

Figure 4:
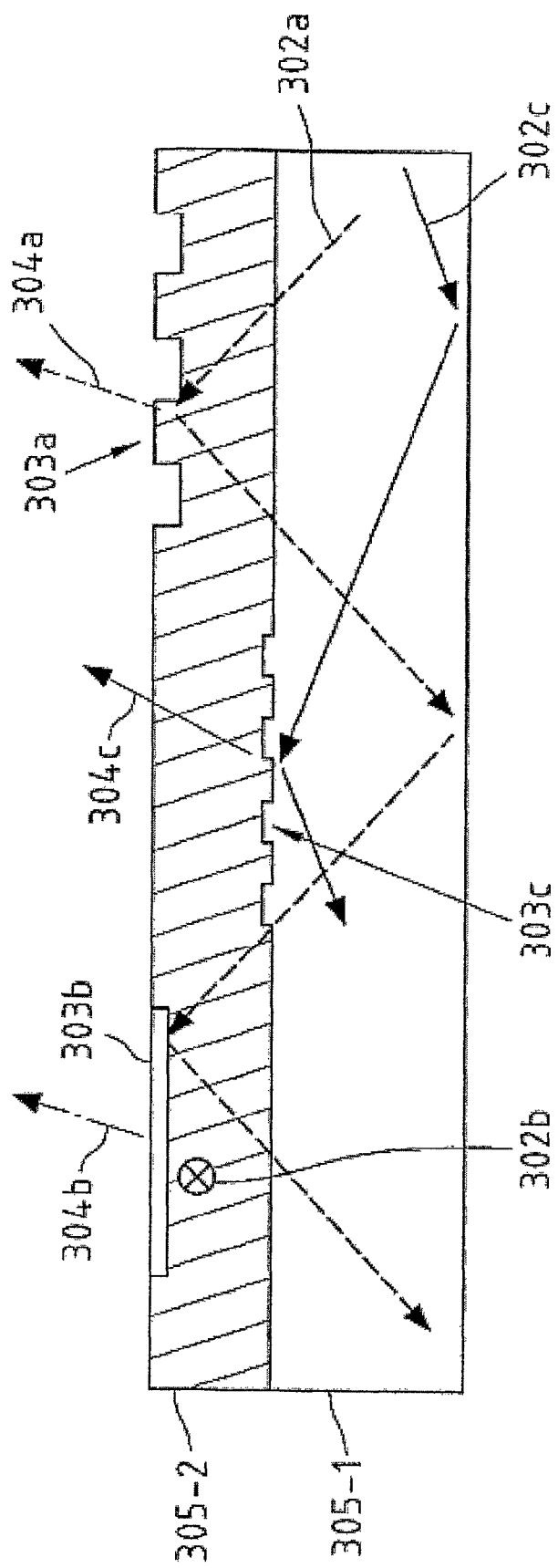
FIG. 4 is a more detailed cross-sectional view of an out-coupling layer structure shown in FIG. 3 for transmissive out-coupling.

FIG. 4 shows more detailed cross-sectional views of the waveguide 305 of apparatus 300 according to FIG. 3 for transmissive out-coupling. Therein, reference numbers already used in FIG. 3 are maintained. Furthermore, the orientation of the diffraction gratings 303a, 303b and 303c as illustrated in FIG. 5 also applies to FIG. 4. The waveguide 305 according to FIG. 4 consists of a substrate 305-1 (which corresponds to the grating layer 14a in FIG. 2) and a coating layer 305-2 (which corresponds to the waveguide 14b in FIG. 2). The output coupling grating 303c for blue light 302c is formed on the waveguide substrate 305-2, while the output coupling grating 303b for green light 302b (illustrated as an "X" within a circle) and the output coupling grating 303a for red light 302a are formed on top of the coating layer 305-2.

The refractive index of the coating layer 305-2 is selected to be smaller than that of the substrate 305-1, and the incidence angle of blue light 302c is chosen high enough to support total internal reflection of blue light at the interface between substrate 305-1 and coating layer 305-2. This effectively isolates the blue light 302c from the diffraction gratings 303a and 303b for the red and green lights thus enabling output coupling of blue light 302c to be obtained from diffraction grating 303c only. Moreover, the thickness of the coating layer 305-2 is selected to be small enough to enable decoupling of out-coupled blue light 304c from the diffraction gratings 303a and 303b for the red and green lights.

To prevent output coupling of red light from the diffraction grating 303c intended for blue light, the grating period of diffraction grating 303c is selected to be small enough to function as an effective index medium for long wavelength (red) light. In other words, the grating 303c for blue light does not support any diffracted modes for red light, thus preventing the red light 302a from being coupled out of the waveguide by the diffraction grating 303c for the blue light.

To prevent green light from being output coupled by the diffraction grating 303c intended for blue light, the green light 302b is coupled into the waveguide 305 in an orthogonal direction with respect to the blue light 302c. Since the green light 302b is now propagating in parallel to the groove direction of the diffraction grating 303c for blue light (see FIG. 5), it is effectively not coupled out by the diffraction grating 303c.

The output coupling gratings 303b and 303a for green and red lights are formed on top of the coating layer 305-2, and the incidence angles of the respective light are selected to be small enough to enable propagation through the interface between the substrate 305-1 and the coating layer 305-2, but high enough to support total internal reflection at the interface between the coating layer 305-2 and the medium adjoining to the coating layer 305-2, for instance air (in FIG. 2, this interface is determined by the cladding layer 14c).

As depicted in FIG. 5, the groove direction of the grating 303b for green light is selected to be orthogonal with respect to the groove direction of the gratings 303a and 303c for the red and blue lights. This enables the green light 302b to be coupled out of the waveguide 305 using the diffraction grating 303b, while the red light 302a is not affected by it. On the other hand, the orthogonal groove direction decouples the green light 302b from interaction with the diffraction grating 303a for the red light.

The grating configuration as described above enables the blue light 302c, the green light 302b and the red light 302a to be coupled out of the waveguide 305 by the gratings 303c for the blue light, 303b for the green light and 303a for the red light, respectively, yielding out-coupled blue light 304c, out-coupled green light 304b and out-coupled red light 304a. Cross talk of the output coupling is effectively eliminated with the use of the coating layer 305-2 and crossed grating configurations.

Also using diffractive slanted gratings (e.g., see T. Levola, P. Laakkonen "Replicated Slanted Gratings with a High Refractive Index Material for in and Outcoupling of Light", Optics Express, vol. 15, No. 5, pages 2067-2074) in FIGS. 3-5 can provide improvement in the out-coupling efficiency of the backlight layer structure.

Figure 6:
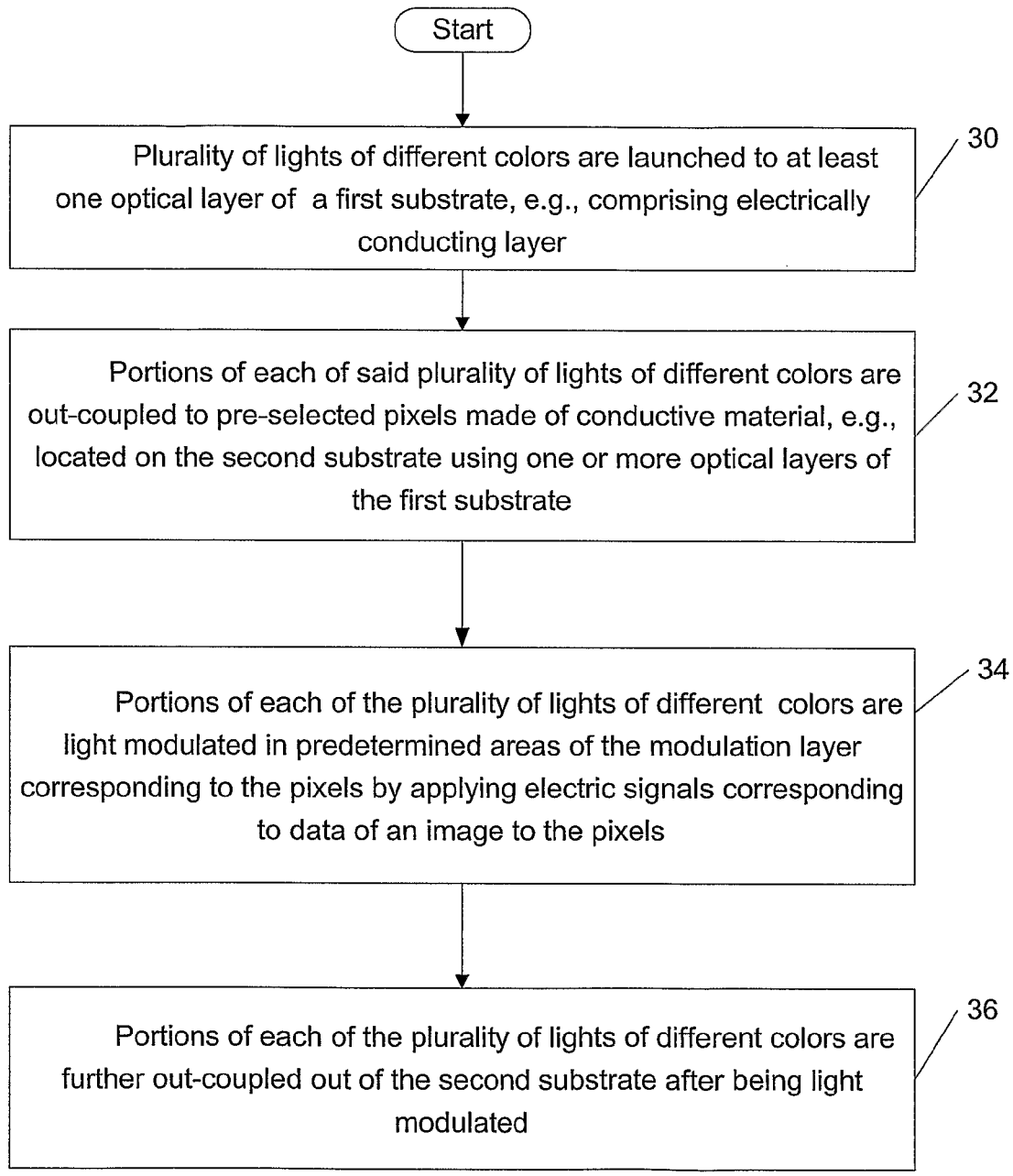
FIG. 6 is a flow chart for using a display structure with integrated backlighting, according to an embodiment of the present invention.

FIG. 6 shows an example of a flow chart for using a display structure with integrated backlighting, according to an embodiment of the present invention.

The flow chart of FIG. 6 only represents one possible scenario among others. It is noted that the order of steps shown in FIG. 6 is not absolutely required, so in principle, the various steps can be performed out of order. In a method according to the embodiment of the present invention, in a first step 30, a plurality of lights of primary colors (e.g., red, blue, green) are launched to at least one optical layer of a first substrate, e.g., comprising electrically conducting layer. In a next step 32, the portions of each of said plurality of lights of different colors are diffractively out-coupled to pre-selected pixels comprising conductive electrodes and, e.g., located on the second substrate using one or more optical layers of the first substrate. In a next step 34, the portions of each of said plurality of lights of different colors are light modulated in predetermined areas of the modulation layer corresponding to said pixels by applying electric signals corresponding to data of an image to the pixels for providing electric fields between said pixels and the electrically conducting layer. In a next step 36, the portions of each of the plurality of lights of different colors are further out-coupled out of the second substrate after being light modulated by the electric fields corresponding to the data of said image for providing said image.

Figure 7:
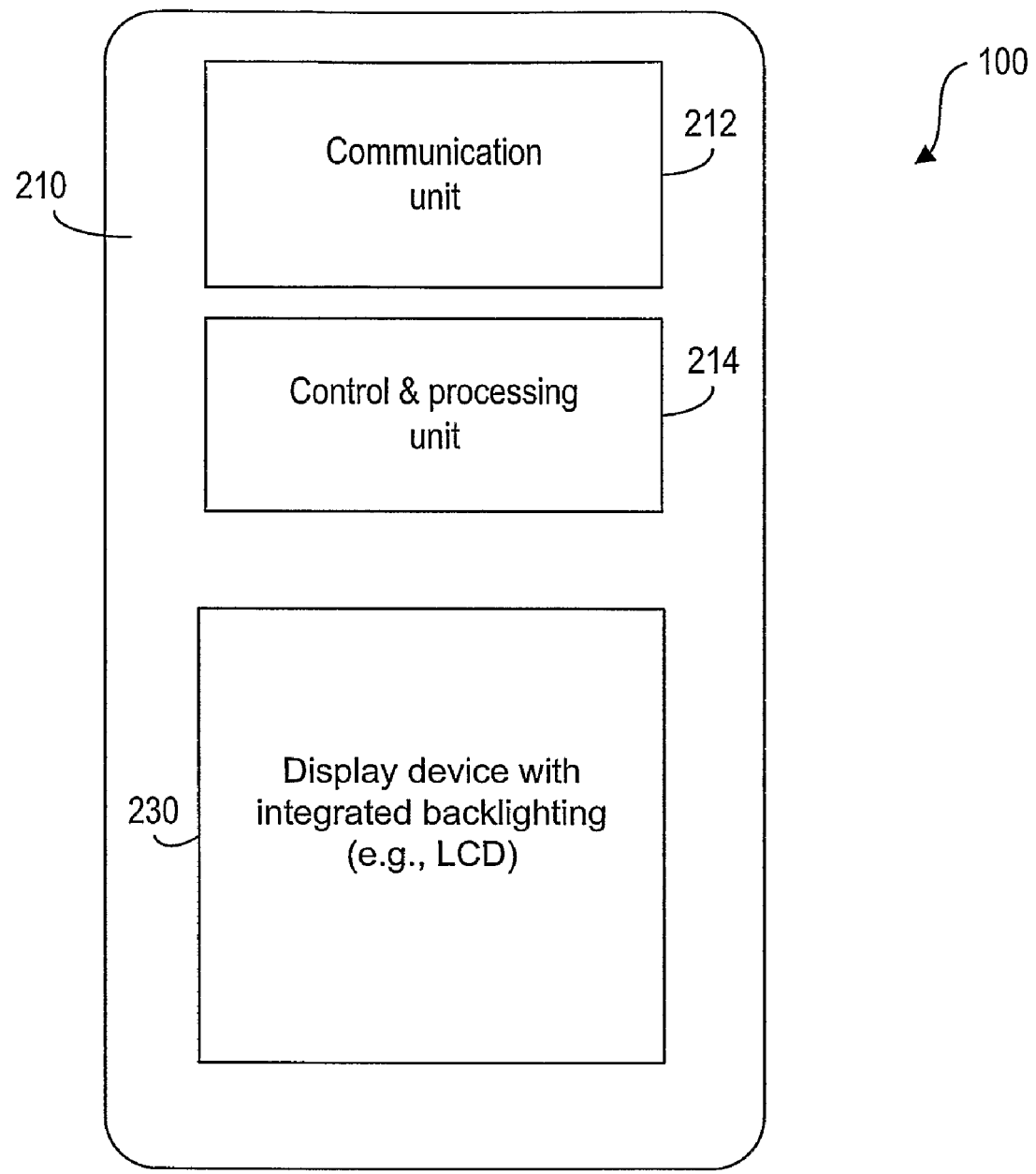
FIG. 7 is a schematic representation of an electronic device utilizing a display structure with integrated backlighting, according to an embodiment of the present invention.

FIG. 7 shows a schematic representation of an electronic device 100 utilizing a display device with integrated backlighting 230, according to an embodiment of the present invention. The display module 230 can be used in the electronic (e.g., portable or non-portable) device 100, such as a mobile phone, a computer, a monitor, a TV set, personal digital assistant (PDA), communicator, portable Internet appliance, digital video and still camera, a computer game device, and other electronic devices utilizing viewing. As shown in FIG. 7, the device 100 has a housing 210 to house a communication unit 212 for possible receiving and transmitting information from and to an external device (not shown). The device 100 also has a controlling and processing unit 214 for handling the received and transmitted information. The controlling and processing unit 214 is operatively connected to the module 230 to provide image data which is displayed by the module 230 using various embodiments of the present invention described herein.

It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
   a first substrate;
   a second substrate; and
   a modulation layer between said first and second substrates, wherein light modulation in predetermined areas of said modulation layer corresponding to pixels comprising conductive electrodes and located on the first or the second substrate is provided by applying electric signals corresponding to data of an image to said pixels for providing electric fields between said pixels located on the first or the second substrate and an electrically conducting layer of the opposite second or first substrate,
      wherein said first substrate comprises a waveguide configured to guide lights of different colors and further comprises
      a first optical layer configured to provide diffractive out-coupling of light of at least a first color to pre-selected pixels or subpixels of said pixels, and
      a second optical layer, stacked on the first optical layer, configured to provide diffractive out-coupling of light of at least a second color to pre-selected pixels or subpixels of said pixels,
   wherein said second substrate is configured to provide further out-coupling of lights of different colors after the light being modulated by said electric fields corresponding to said data of said image for providing said image.

2. The apparatus of claim 1, wherein said first substrate comprises said electrically conducting layer and said second substrate comprises said pixels.

3. The apparatus of claim 1, wherein said first substrate is a planar rigid substrate.

4. The apparatus of claim 1, wherein said second optical layers comprises one optical layer with disposed a plurality of diffraction gratings such that each of said diffraction gratings is configured to provide said diffractive out-coupling for light of only one color of said different colors, the further plurality being equal to said plurality.

5. The apparatus of claim 4, wherein said one or more optical layers further comprises a cladding layer next to said second optical layer for providing said diffractive out-coupling, wherein index of refraction of said cladding layer is substantially lower than index of refraction of said second optical layer.

6. The apparatus of claim 4, wherein at least one of said plurality of diffraction gratings is a slanted grating.

7. The apparatus of claim 1, wherein said different colors are red, green and blue.

8. The apparatus of claim 1, wherein said waveguide is configured to launch said light of different colors using at least one of: prism coupling, edge coupling, grating coupling and butt coupling.

9. The apparatus of claim 1, wherein said light of different colors has a predetermined optical polarization.

10. The apparatus of claim 1, wherein said modulation layer is a liquid crystal and said light modulation is provided for varying a state of optical polarization of said light of different colors.

11. The apparatus of claim 10, further comprises a polarization layer configured to provide, after said varying the state of optical polarization, light intensity modulation of said light of different colors for said further out-coupling from the second substrate, wherein said polarization layer is disposed on said second substrate or said polarization layer is a separate layer next to said second substrate.

12. The apparatus of claim 1, wherein said waveguide is made of a birefringent material or said first substrate further comprises a birefringent layer next to said at least one optical layer for redistributing optical polarization states of said plurality of lights of different colors to increase efficiency of said out-coupling.

13. The apparatus of claim 1, wherein said modulation layer is an electro-wetting material.

14. The apparatus of claim 1, wherein said electrically conducting layer is a wiregrid polarizer.

15. An electronic device, comprising: a data processing unit; an optical engine operatively connected to the data processing unit for receiving data of an image from the data processing unit; a display device with integrated backlighting operatively connected to the optical engine for forming said image based on the data, wherein the display device is configured as the apparatus as claimed in claim 1.

16. The electronic device of claim 15, wherein said waveguide comprises one optical layer with disposed a plurality of diffraction gratings such that each of said diffraction gratings is configured to provide said out-coupling for light of only one color.

17. A method, comprising:
coupling light of at least first and second different colors to a waveguide of a first substrate;
diffractively out-coupling light of at least said first color through a first optical layer of the first substrate to pre-selected pixels or subpixels of said pixels;
diffractively out-coupling light of at least said second color through a second optical layer of the first substrate to pre-selected pixels or subpixels of said pixels wherein the second optical layer is stacked on the first optical layer,
wherein said pre-selected pixels or subpixels of said pixels comprising conductive electrodes and located on the first or a second substrate;
modulating said light of different colors in predetermined areas of a modulation layer corresponding to said pixels by applying electric signals corresponding to data of an image to said pixels for providing electric fields between said pixels in the first or second substrate and an electrically conducting layer of an opposite, second or first substrate,
wherein said modulation layer is between the first and second substrates; and further out-coupling said light of different colors out of said second substrate after said light being modulated by said electric fields corresponding to said data of said image for providing said image.

18. The method of claim 17, wherein said first substrate comprises said electrically conducting layer and said second substrate comprises said pixels.

19. An apparatus, comprising:
first means for light propagation;
second means for light propagation; and
means for modulation between said first and second means for light propagation,
wherein light modulation in predetermined areas of said means for modulation corresponding to pixels comprising conductive electrodes and located on the first or the . second means for light propagation is provided by applying electric signals corresponding to data of an image to said pixels for providing electric fields between said pixels and an electrically conducting layer of an opposite second or first means for light propagation,
wherein said first means for light propagation comprises a waveguide configured to provide launching of light of different colors and comprising
a first optical layers configured to provide diffractive out- coupling of light of at least a first colors to pre-selected pixels or subpixels of said pixels,
a second optical layer, stacked on the first optical layer. configured to provide diffractive out-coupling of light of at least a second color,
wherein said second means for light propagation is configured to provide further out-coupling of said light of different colors after said light being modulated by said electric fields corresponding to said data of said image for providing said image.

20. The apparatus of claim 19, wherein said first means for light propagation is a first substrate, said second means for light propagation is a second substrate and said means for modulation is a modulation layer.

21. An apparatus, comprising:
a first substrate;
a second substrate: and
a modulation layer between said first and second substrates. wherein light modulation in predetermined areas of said modulation layer corresponding to pixels comprising conductive electrodes and located on the first or the second substrate is provided by applying electric signals corresponding to data of an image to said pixels for providing electric fields between said conductive electrodes of the first or the second substrate and an electrically conducting layer of an opposite, the second or the first substrate, wherein said first substrate is configured to receive and guide light of different colors and comprises a plurality of diffraction gratings having
- a first diffraction grating configured to provide diffractive out-coupling of light of at least a first color to pre-selected pixels or subpixels of said pixels, and
- a second diffraction grating configured to provide diffractive out-coupling of light of at least a second color to pre-selected pixels or subpixels of said pixels, wherein a groove direction of the second diffraction grating is substantially orthogonal to a groove direction of the first diffraction grating, and wherein said second substrate is configured to provide further out-coupling of said light of different colors after said light being modulated by said electric fields in said modulation layer corresponding to said data of said image for providing said image.

22. A method, comprising:

coupling light of different colors to a first substrate, wherein the first substrate is configured to receive and guide light of different colors and comprises a first diffraction grating and a second diffraction grating;

using the first diffraction grating to diffractively out-couple light of at least a first color to pre-selected pixels or subpixels of said pixels;

using the second diffraction grating to diffractively out-couple light of at least a second color to pre-selected pixels or subpixels of said pixels, wherein a groove direction of the second diffraction grating is substantially orthogonal to a groove direction of the first diffraction grating, and wherein said pixels comprising conductive electrodes and located on the first or a second substrate;

modulating portions of each of said light of different colors in predetermined areas of a modulation layer corresponding to said pixels by applying electric signals corresponding to data of an image to said pixels for providing electric fields between said conductive electrodes located on the first or the second substrate and an electrically conducting layer of an opposite, the second or the first substrate, wherein said modulation layer is between the first and second substrates; and further out-coupling said portions of each of said light of different colors out of said second substrate after being modulated by said electric fields corresponding to said data of said image for providing said image.

\* \* \* \* \*